Dec. 2, 1930.   M. A. HOYT   1,783,618
LOCKING DEVICE FOR LAPPING MACHINES
Filed Nov. 10, 1927   2 Sheets-Sheet 1

INVENTOR
MILTON A. HOYT.
BY
ATTORNEY

Dec. 2, 1930.          M. A. HOYT          1,783,618
LOCKING DEVICE FOR LAPPING MACHINES
Filed Nov. 10, 1927    2 Sheets-Sheet 2

INVENTOR
MILTON A. HOYT.
BY
ATTORNEY

Patented Dec. 2, 1930

1,783,618

UNITED STATES PATENT OFFICE

MILTON A. HOYT, OF EAST ORANGE, NEW JERSEY, ASSIGNOR TO WESTINGHOUSE LAMP COMPANY, A CORPORATION OF PENNSYLVANIA

LOCKING DEVICE FOR LAPPING MACHINES

Application filed November 10, 1927. Serial No. 232,260.

This invention relates to machines for producing coil forming dies employed to bend fine filamentary wire to helical form to constitute filaments for incandescent lamps and relates more particularly to a machine such as shown and described in my copending application Serial No. 150,873, filed November 26, 1926, a machine and method for producing coil forming dies.

It is important in the manufacture of incandescent electric lamps to wind a filament of hair like wire to helical form for use as a resistance element to constitute a light source. Helically wound lamp filaments have usually been produced by winding a wire upon a mandrel which necessitated the removal of the mandrel after the helix had been produced.

As set forth in the above mentioned copending application, it has been found desirable to helically wind a wire in the absence of a mandrel by moving the wire through a predetermined path and into engagement with a recessed or cavity die. The die is associated with a lip or separator-member so that as the wire issues from the die in a series of convolutions, the lip serves to separate the convolutions and determine the pitch of the helix. The die employed for winding a wire is preferably composed of a wear resisting material such, for example, as a diamond, sapphire or it may be of highly tempered extremely hard steel. The use of a diamond, however, has been found preferable and the problem of producing the necessary recess or cavity in the diamond block resulted in the invention set forth in the above mentioned copending application wherein a machine is shown and described for grinding a cavity in a diamond block.

This machine includes means for supporting a diamond die block in operative relation to a rotating lapping tool, the machine serving to automatically move the diamond into intermittent resilient contact with the tool; the machine further provides that when the tool is worn and a new tool is required, the same may be produced so as to position a new lapping tool in exactly the same location as had been occupied by the previous lapping tool.

The lapping tools are usually made from drill-rod of a given diameter, either hardened or soft, or of any other material such as copper or the like, the lapping wheel or tool itself being formed at one end of the tool rod. This lapping tool is rotated at high speed, the periphery being charged with diamond dust.

In order to produce a cavity in a diamond block, it is necessary to employ a great number of tools during the formation of the cavity, since the wear is excessive and each tool only lasts a comparatively short time.

The machine employed for producing the cavity in a diamond comprises means for rotatably supporting a tool rod. Adjacent to the tool rod is a tool holder or turret comprising a plurality of shaping tools for producing lapping wheels. These tools may be moved for successive engagement with the tool rod to shape the same and produce a lapping wheel upon the end thereof. Means are also provided for movably supporting a diamond block. This block is reciprocable through a given path so that it is extremely important that the tools for forming the lapping wheel be accurately positioned for their operation in producing the lapping wheel so that the said wheel when produced will always have the same relation with the diamond block. When producing a lapping wheel by means of the successive application of the several forming tools, the machine of the above mentioned copending application provides means for locking the turret which means comprises apertures in the turret, which register with an aperture in the bed plate upon which the turret rotated and a tapered pin which extended through the aperture in the turret and into the bed plate.

The present invention aims to provide an improved form of locking means for the turret and an object of the invention is to provide such locking means which may be more effectively and conveniently actuated.

Another object of the invention is to provide a locking element which may be self adjusting to accurately align a cutting tool for the formation of a lapping wheel.

Another object of the invention is to provide locking mechanism including a floating element for locking a movable and fixed member in accurate predetermined relation.

Other objects and advantages of the invention will be apparent as the description proceeds.

The invention will be more fully understood by reference to the accompanying drawings in which.

Figure 1:
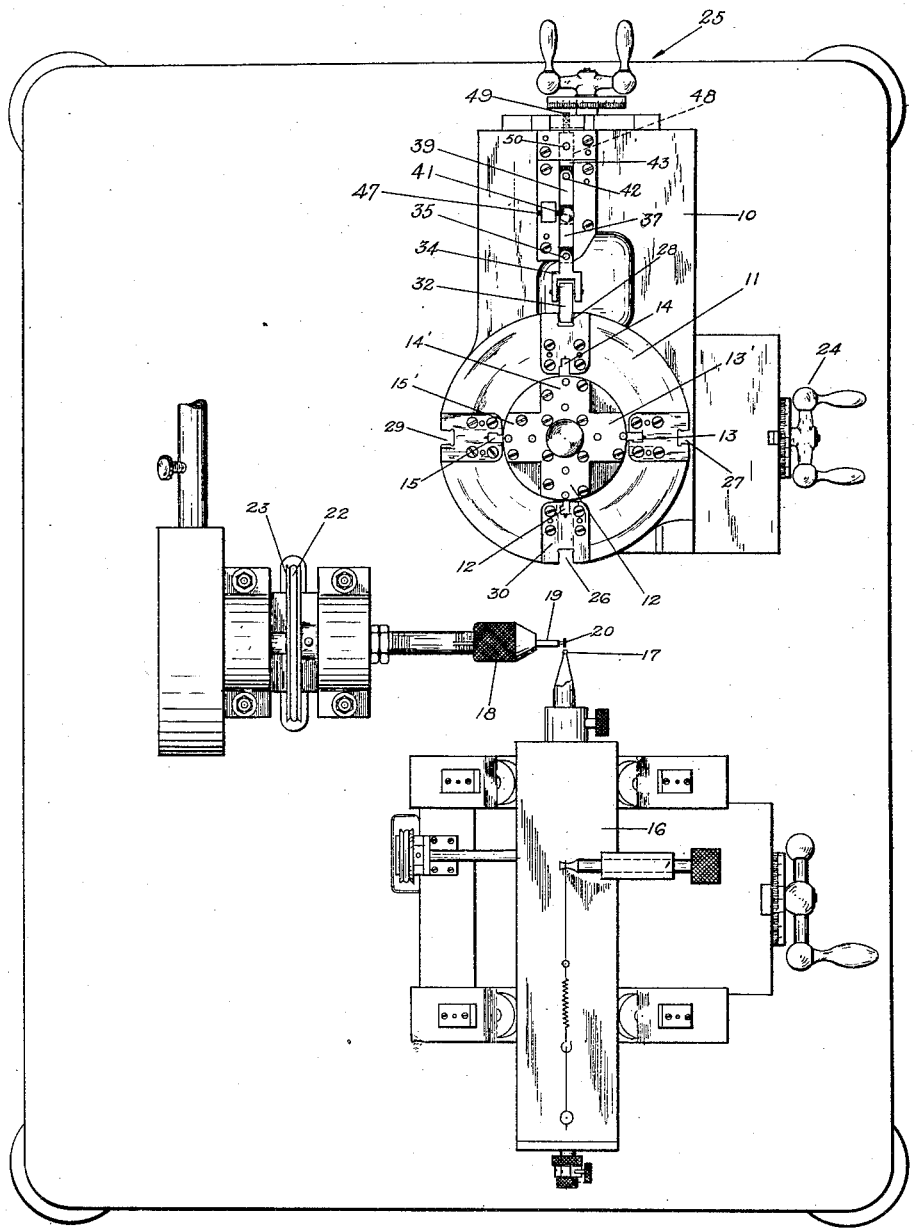
Fig. 1 is a plan view of a diamond lapping machine including the present locking device.

The present invention will be more readily appreciated when it is understood that the die for performing the coiling operation must be small enough to operate upon wire of extremely fine diameter. For example, if a filament for a 60 watt lamp is to be produced it is necessary to coil a wire .0025 of an inch in diameter. This means that the slot or cavity of the die must be just slightly wider than .0025 of an inch. A coiled filament or helix of this diameter wire has an outside diameter of substantially .009 or .010 of an inch and the curvature of the slot or cavity is formed so that its diameter is about the same as the diameter of the helix. The die block employed for the above purpose has a surface dimension of .021 x .030 inches or even as small as .011 x .030.

In addition to the extremely small dimensions to be contended with it is preferable that the mouth of the slot be so formed that the longer parallel edges thereof are straight to maintain uniformity in the pitch of the helix formed by the die.

Several factors therefore enter into the formation of a cavity die as made in accordance with the present invention. The first resides in the difficulty in performing the various operations upon such an extremely small area. Second, in operating upon a material having the greatest known degree of hardness. Third, in renewing the lapping or cutting tool so that a new tool will continue the cutting operation in exactly the same manner as the removed worn tool. Fourth, in adjusting the various elements to exact relative positions for the lapping operation and fifth, in so controlling the degree of contact between the surface to be lapped and the tool to obtain the most effective removal of material to produce the cavity in a relatively rapid and efficient manner.

By reason of the present improved machine for the above purpose, the various requirements are met in producing a die with a cavity having its dimensions of the proper degree of accuracy and in producing such die in a substantially automatic manner.

The machine to which the present invention is applied is generally the same as that disclosed in the above mentioned copending application and may comprise a suitable supporting table or bed plate 10 having a platform 10' of disc-like form upon which a tool holder or turret 11 is rotatably mounted. The tool holder is provided with a plurality of forming tools 12, 13, 14 and 15, secured in chucks or Johannson blocks 12', 13', 14' and 15' respectively so that they may be readily and accurately adjusted. Such chucks or blocks are well known to mechanics for obtaining fine adjustments and a detailed description thereof is not thought to be necessary.

Adjacent to the tool holder is a reciprocable carrier 16 for holding a die-block 17 and intermediate the die-block and the tool holder is positioned a rotatable member or chuck 18 for supporting a tool rod 19.

As shown, the tool rod has formed on the end thereof, a lapping wheel 20, this wheel having been formed by the tools in the turret 11. Means are provided in the form of a pneumatic drive 21 for rotating the chuck 18 at high speed and means are also provided whereby the carrier 16 is intermittently moved into contact with the rotating lapping wheel 20. When a tool is worn and a new tool is to be made, the air supply for driving the tool 20 is cut off and the tool is driven by means of a belt 22 through pulley 23 secured to the shaft of the chuck 18. The belt may be driven by any suitable means as a motor (not shown). Mechanism in the form of micrometer adjustment devices 24 and 25 are provided for adjusting the turret 11 so that the various tools thereon may be moved to proper relation for the formation of a lapping wheel.

As previously indicated, the degree of accuracy required in the formation of a cavity in the die makes it necessary to locate each tool in precisely the same position for the formation of a new lapping wheel as the said tool had occupied during the formation of a previous lapping wheel, thus bringing each lapping wheel formed in precisely the right position to continue the lapping operation without changing the dimensions of the cavity being formed in the die.

It is thought that the foregoing description is sufficient to generally outline the various elements of the present machine inasmuch as the same is fully described and illustrated in the above mentioned copending application.

Figure 2:
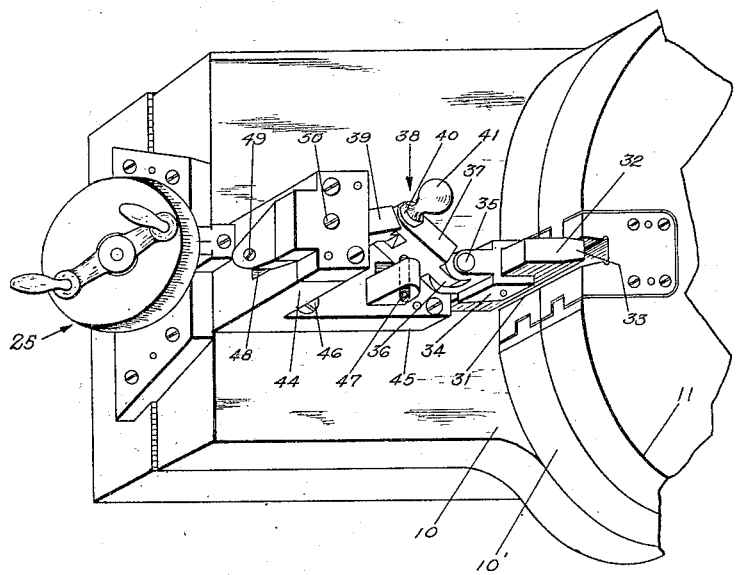
Fig. 2 is an enlarged perspective view of a locking device for holding a turret in fixed relation to a bed plate; and, Fig. 3 is a perspective view of a die block with a tool in a cutting position.
Figure 3:
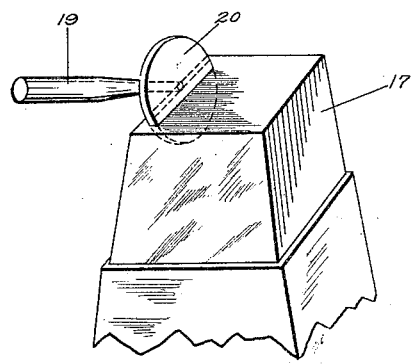

The present invention is primarily concerned with the locking mechanism for holding each tool in exactly the right position. This mechanism may comprise tapered slots 26, 27, 28 and 29 in the periphery of the turret 11. Each slot may be formed in an insert 30 of wear resisting material as tempered steel. The platform 10' is provided with a tapered slot 31 (see Fig. 2) corresponding in form to the slots in the turret; the said slot 31 may also be formed in an insert of hardened material. The position of the tools may be predetermined so that when the slot in the turret registers with the slot 31 in the bed plate the tool will be in operative relation to the tool rod 19 for the formation of a lapping wheel. Means for locking the turret may comprise a floating wedge shaped member 32 having a tapered end 33 accurately ground or lapped to enter the slot 31 in the base plate and one of the slots in the turret and thus align and hold the turret in its proper relative position for the operation of a tool.

In order to facilitate the application of the wedge member 32 into the slots, the said member is pivotally mounted in a bifurcated member or link 34. This member is pivoted on a pin 35 passing through an end 36 of a free arm 37 of a toggle joint 38. This toggle is comprised of, the arm 37 and an arm 39 pivotally held by a pin 40 which is also provided with a finger piece 41 for actuating the toggle. One end of the arm 39 is pivoted at 42 to a block 43 in an extension 44 of a bracket 45, the bracket being secured by screws 46 to the bed plate 10. A movement of the fingerpiece 41 serves to operate the toggle and move the member 32 into or out from aligned or registered slots in the turret and the bed plate. A stop pin 47 is provided to limit the movement of the toggle so that the wedge member 32 may be moved into the slots to the exact degree required to hold the turret in its relative position.

A further adjustment is provided by having the block 43 held adjustable in position. This block is set in a recess 48 in the extension 44 and may be moved to the desired position by an adjusting screw 49. When properly positioned, the block is held by a set screw 50.

The present locking device operates to quickly and accurately secure the turret 11 so that one of the tools may operate upon the tool rod. When the first lapping wheel is made the respective tools are adjusted for their respective operations. Thus when it is necessary to form another tool, the turret may be rotated to bring the required tool into operative relation with the work or tool rod and the toggle 38 may be moved by means of the finger-piece 41 to cause the member 32 to enter the slot as 29 adjacent the tool 12. The member 32 entering the slots is forced inwardly and automatically aligns the slots and holds the turret so that the tool 12 is firmly retained in position to perform its required function upon the tool rod. The member 32 is so constructed as to have relatively large contact areas to engage the turret and hold the same against vibration during the formation of a lapping tool.

The toggle arrangement for actuating the locking member 32 serves to permit the said member to be moved into the aligned slots to the exact degree so that the locking member is pressed against the surfaces of the slots with exactly the right pressure. The length of the toggle stroke may be adjusted by changing the position of the block 43 and the movement of the member 32 is controlled by the stop-member 47.

It will be evident that when setting the various tools for operation on the work blank or tool rod 19, each tool may be adjusted in its universal holder or block and secured in a fixed position whereby it is retained in a given relation to the tool holder 11. Any suitable means for adjusting the holder vertically may be provided, as for example, a micrometer adjustment device as shown in the aforementioned copending application but not shown in the present drawing. Forward and transverse movement of the tool holder may be had by micrometer adjustment means 25 and 24 respectively as shown in the accompanying drawing. This type of device is well known in the art of precision instrument making and a detailed description thereof has been omitted.

When one tool has been made in its proper position for a lapping operation, the various adjustable elements remain fixed except to permit a movement of the tool holder to and from the work which is accomplished by the micrometer adjustment device 25.

When the first tool as tool 12, which may be the initial or turning down tool, is in operation, the locking member holds the tool holder in position. After this operation, the locking member is removed and the next tool 13 which may be the cutting off tool is moved to position and the locking member 32 is moved into the slot in the platform and the slot in the tool holder adjacent to the tool in use so that the same may be held in a fixed position during its operation. The tool 14 which may be the necking tool and tool 15 which may be the finishing tool are successively brought into operation and the tool holder is firmly held in its required position by means of the present improved locking device.

After the formation of a lapping wheel, the tool holder may be backed away from the formed wheel. The tool holder and the platform upon which it rotates are always held in the same bodily relation since the platform or bed plate and the tool holder are moved as a whole by the micrometer adjustment device 25.

The operation of the locking member is not only to hold the tool holder in a given position, but it serves to accurately adjust the said holder. It is obvious that when moving the tool holder to align a slot thereof with the slot in the platform it is difficult to make an accurate alignment of the slots. By reason of the member 32 and its actuating mechanism it is only necessary to bring the slots into approximate alignment and by operating the toggle the member is forced into the slots and actually aligns them, bringing the tool holder to a precise working position. This function of the locking member makes the adjustment of the tool holder automatic and independent of the uncertain skill of an operator.

With the present device, the operation of cutting a slot in a diamond block or other hard body is greatly facilitated and greater accuracy is made possible.

Although a preferred embodiment of the invention is shown and described herein it is to be understood that modifications may be made therein without departing from the spirit and scope of the invention as set forth in the appended claims.

What is claimed is:

1. A machine for making a wheel for lapping a wear resisting body comprising means for supporting a tool rod, a rotatable tool holder having a plurality of tools, means for movably supporting said tool holder to successively apply said tools to said tool rod, a toggle joint, a locking member, pivoted means having the axis thereof disposed in a plane at right angles to the axis of rotation of said holder, said means connecting said locking member with said toggle, and means for moving said toggle to engage said member with said tool holder and retain the same in position during an operation of a tool.

2. A machine for making a wheel for lapping a wear resisting body comprising means for supporting a tool rod, a rotatable tool holder having a plurality of tools, means for movably supporting said tool holder to successively apply said tools to said tool rod, a toggle joint, a locking member, pivoted means having the axis thereof disposed at right angles to the axis of rotation of said holder, said means connecting said member with said toggle, means for moving said toggle to engage said member with said tool holder to retain the same in position during an operation of a tool and means for limiting the movement of said toggle.

3. A device for performing operations upon a work blank comprising a platform, a rotatable tool holder mounted on said platform, a plurality of tools disposed in spaced relation and projecting from said tool holder, a plurality of slots in said tool holder, a slot in said platform arranged to be aligned with a slot in said tool holder when one of said tools is in an operative position, a toggle, a movable member, means intermediate said toggle and said member for adjustably supporting the latter and means for moving said member into said slots to align the slots and hold said tool holder in accurate position during an operation of said tool holder.

4. A device for performing operations upon a work blank comprising a platform, a rotatable tool holder mounted on said platform, a plurality of tools disposed in spaced relation and projecting from said tool holder, a plurality of tapered slots in said tool holder, a tapered slot in said platform arranged to be aligned with a slot in said tool holder when one of said tools is in an operative position, a locking member movable into said slots, a toggle joint, pivoted means connecting said locking member with said toggle and means for actuating said toggle to move said locking member into said slots to align the same.

5. A device for performing operations upon a work blank comprising a platform, a rotatable tool holder mounted on said platform, a plurality of tools disposed in spaced relation and projecting from said tool holder, a plurality of slots in said tool holder, a slot in said platform arranged to be aligned with a slot in said tool holder when one of said tools is in an operative position, a locking member movable into said slots, a toggle joint, a pivoted link connecting said member with said toggle, means for actuating said toggle to move said locking member into said slots to align the same and means for limiting the movement of said toggle.

6. A metal working mechanism comprising a base member, a tool holder movably mounted on said base member, a plurality of tools projecting from said tool holder, said tool holder having a slot adjacent to each of said tools, said base member having a slot in a predetermined position, said last mentioned slot being arranged for successive approximate alignment with one of the slots in said tool holder and a member movable into the slot in said base and a slot in said tool holder and means for supporting said member adjustably in different planes to accurately align the same and retain the tool for entrance into said slots to adjust the base and holder slots to aligned positions.

7. A metal working mechanism comprising a base member, a tool holder movably mounted on said base member, a plurality of tools projecting from said tool holder, said tool holder having a tapered slot adjacent to each of said tools, said base member having a tapered slot in a predetermined position, said last mentioned slot being arranged for successive alignment with one of the slots in said tool holder, a locking device comprising a tapered member, means for moving said member into a slot in said base and one of said slots in said tool holder to align the slots and retain the tool holder in position during an operation of one of said tools and means for adjustably connecting said last mentioned means with said tapered member.

8. A metal working mechanism comprising a base member, a tool holder movably mounted on said base member, a plurality of tools projecting from said tool holder, said tool holder having a slot adjacent to each of said tools, said base member having a slot in a predetermined position, said last mentioned slot being arranged for successive alignment with one of the slots in said tool holder, a locking device comprising a toggle joint, a link pivoted to one arm of said toggle, a locking member pivotally attached to said link and means for actuating said toggle to move said locking member into a slot in said base and into a slot in said tool holder to align the slots and retain the tool holder in position during an operation of one of said tools.

9. A metal working mechanism comprising a base member, a tool holder movably mounted on said base member, a plurality of tools projecting from said tool holder, said tool holder having a slot adjacent to each of said tools, said base member having a slot in a predetermined position, said last mentioned slot being arranged for successive alignment with one of the slots in said tool holder, a locking device comprising a toggle joint, a link pivoted to a free arm of said toggle, a locking member pivotally attached to said link, means for actuating said toggle to move said locking member into a slot in said base and into a slot in said tool holder to align the slots and retain the tool holder in position during an operation of one of said tools and means for limiting the motion of said toggle.

10. A metal working mechanism comprising a base member, a tool holder movably mounted on said base member, a plurality of tools projecting from said tool holder, said tool holder having a slot adjacent to each of said tools, said base member having a slot in a predetermined position, said last mentioned slot being arranged for successive alignment with one of the slots in said tool holder, a locking device comprising a toggle joint, a link pivotally attached to a free arm of said toggle, a locking member pivotally attached to said link, means for actuating said toggle to move said locking member into a slot in said base and into a slot in said tool holder to align the slots and retain the tool holder in position during an operation of one of said tools, means for limiting the motion of said toggle and means for changing the degree of movement of said locking member toward said slots.

In testimony whereof, I have hereunto subscribed my name this 9th day November, 1927.

MILTON A. HOYT.